(12) United States Patent
Young (10) Patent No.: US 9,645,696 B2
(45) Date of Patent: May 9, 2017

(54) VISUAL EDITOR FOR DEFINING GEO FENCE BOUNDARIES

(75) Inventor: Stacy Young, Kanata (CA)

(73) Assignee: Adobe Systems Incorporated, San Jose, CA (US)

( * ) Notice: Subject to any disclaimer, the term of this patent is extended or adjusted under 35 U.S.C. 154(b) by 616 days.

(21) Appl. No.: 13/298,055

(22) Filed: Nov. 16, 2011

(65) Prior Publication Data

US 2013/0145302 A1 Jun. 6, 2013

(51) Int. Cl.
*G06F 3/01* (2006.01)
*G06F 3/048* (2013.01)

(52) U.S. Cl.
CPC .................................... *G06F 3/048* (2013.01)

(58) Field of Classification Search
CPC ......... G06F 2203/04808; G06F 3/0488; G06F 2203/04803; G06F 3/04883; G06F 17/30241; G06F 2203/014; G06F 2203/04806; G06F 3/016; G06F 3/041; G06F 3/0425

USPC ................ 455/456.1, 456.3, 414.2; 705/14.1
See application file for complete search history.

(56) References Cited

U.S. PATENT DOCUMENTS

| | | | |
|---|---|---|---|
| 7,242,991 B2* | 7/2007 | Budinger et al. ................ 700/95 |
| 7,565,156 B2* | 7/2009 | Karlsson ..................... 455/456.1 |
| 2009/0132316 A1* | 5/2009 | Florance et al. ................... 705/7 |
| 2011/0010005 A1* | 1/2011 | Tan et al. ....................... 700/214 |
| 2011/0178811 A1* | 7/2011 | Sheridan ......................... 705/1.1 |
| 2012/0185793 A1* | 7/2012 | Binsztok ........................ 715/772 |
| 2012/0309413 A1* | 12/2012 | Grosman et al. ........... 455/456.1 |

* cited by examiner

*Primary Examiner* — Di Xiao
(74) *Attorney, Agent, or Firm* — Wolfe-SBMC (57) ABSTRACT

A workflow authoring program generates a workflow. Further, a visual editor is invoked. In addition, a portion of a map is selected with the visual editor by marking a geo fence with boundaries that indicate the portion. The workflow authoring program also establishes a geo decision point in the workflow at which a determination is made if a condition is met within the geo fence.

21 Claims, 6 Drawing Sheets

VISUAL EDITOR FOR DEFINING GEO FENCE BOUNDARIES

BACKGROUND

1. Field

This disclosure generally relates to workflow systems. More particularly, the disclosure relates to a visual editor that defines a workflow.

2. General Background

Workflow authoring systems typically allows users to author a workflow. The workflow may be utilized to provide a sequence of events in which tasks are to be performed. For example, a project may be assigned a workflow with particular tasks assigned to particular workers and resources at certain dates and times.

Location-aware workflows may be based on geographic locations associated with a workflow. For example, a geographic location may be provided for a task in a workflow. However, current solutions require users to enter the spatial coordinates for geographic locations for a workflow into traditional form fields. Such solutions are not user friendly as a user typically cannot easily correlate an event and/or an action with a geographic location by entering spatial coordinates into traditional form fields.

SUMMARY

In one aspect of the disclosure, a computer program product is provided. The computer program product includes a computer useable medium having a computer readable program. The computer readable program when executed on a computer causes the computer to invoke, at a computing device, a workflow authoring program that generates a workflow. Further, the computer readable program when executed on the computer causes the computer to invoke, at the computing device, a visual editor. In addition, the computer readable program when executed on the computer causes the computer to select, with the visual editor, a portion of a map by marking a geo fence with boundaries that indicate the portion. The computer readable program when executed on the computer causes the computer to establish, with the workflow authoring program, a geo decision point in the workflow at which a determination is made if a condition is met within the geo fence.

In another aspect of the disclosure, a process is provided. The process invokes, at a computing device, a workflow authoring program that generates a workflow. Further, the process invokes, at the computing device, a visual editor. In addition, the process selects, with the visual editor, a portion of a map by marking a geo fence with boundaries that indicate the portion. The process also establishes, with the workflow authoring program, a geo decision point in the workflow at which a determination is made if a condition is met within the geo fence.

In yet another aspect of the disclosure, an apparatus is provided. The apparatus includes a graphical user interface that displays a map. Further, the apparatus includes a processor that invokes a workflow authoring program that generates a workflow and establishes, with the workflow authoring program, a geo decision point in the workflow at which a determination is made if a condition is met within the geo fence. In addition, the processor includes a visual editor that selects, with the visual editor, a portion of a map by marking a geo fence with boundaries that indicate the portion.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A visual editor may be utilized in conjunction with a workflow authoring program. The visual editor may be utilized to define boundaries of a geo fence, which is a user-defined zone that is represented by a shape. An example of a shape is a polygon where each point represents a coordinate on a map to define a space with boundaries. A geo fence may be event-based to trigger rules and/or events. For example, a geo fence may trigger server-side business rules and/or client-side events. In one embodiment, the coordinates of a geo fence are Global Positioning System ("GPS") based. GPS is a space-based global navigation satellite system ("GNSS") and provides location and time information. In another embodiment, the coordinates of a geo fence may be Real-time Locating System ("RTLS") based. RTLS is a type of local positioning system that allows tracking and identification of the location of objects in real-time. For example, badges or tags may be attached to the objects and readers may receive wireless signals from these tags to determine their locations.

The visual editor may be displayed on a touch interface. Accordingly, a user may easily interact with touch inputs through an interface to mark a geo fence. Alternatively, a pointing based system, e.g., a mouse based system, may be utilized by a user to provide inputs to mark a geo fence. Various other interfaces may be utilized.

Figure 1A:
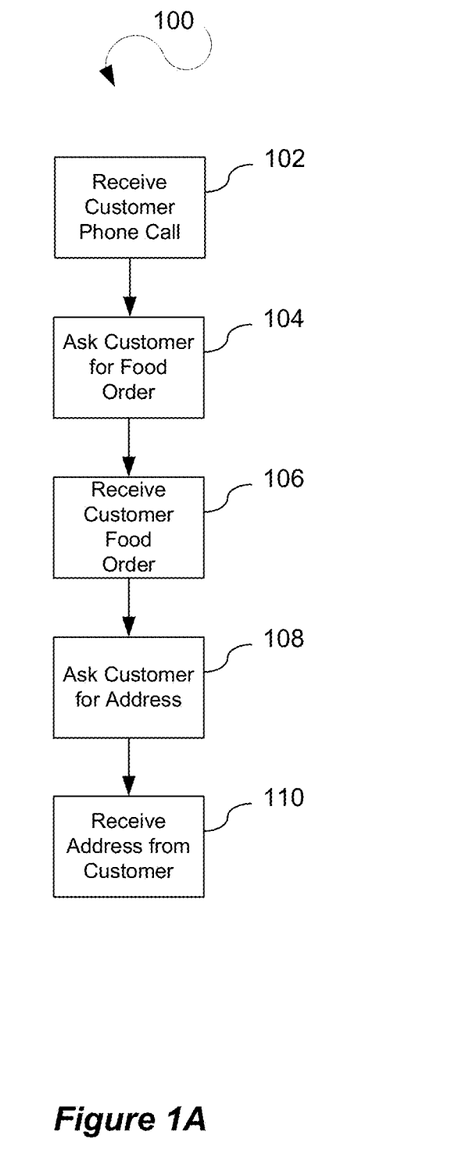
FIG. 1A illustrates an initial workflow.

FIG. 1A illustrates an initial workflow 100. The workflow 100 is illustrated as an example of a workflow that may be authored for restaurant delivery system. For example, customers may call a telephone number to order food delivery from a food delivery service. At a process block 102, the initial workflow 100 may receive a customer phone call. As examples, a worker may manually answer a customer telephone call or an automated telephone system may answer the customer telephone call. Further, at a process block 104, the initial workflow 100 may ask a customer for a food order. As examples, a worker may manually ask the customer for the food order or an automated system may ask the customer for a food order. In addition, at a process block 106, the initial workflow 100 may receive a customer food order. As examples, a worker may manually enter the food order into a computerized system or an automated system may determine the food order from one or more inputs provided by the customer. The inputs provided by the customer may be touch tone inputs, keyboard inputs, voice inputs that may be recognized by a voice recognitions system, or the like. At a process block 108, the workflow 100 asks the customer for the customer's address so that the food order may be delivered to the customer. As examples, a worker may manually ask the customer or an automated system may ask the customer. Further, at a process block 110, the workflow 100 receives the address from the customer. As examples a worker may manually hear the customer's order over the telephone or an automated system may receive the address provided by the customer.

Figure 1B:
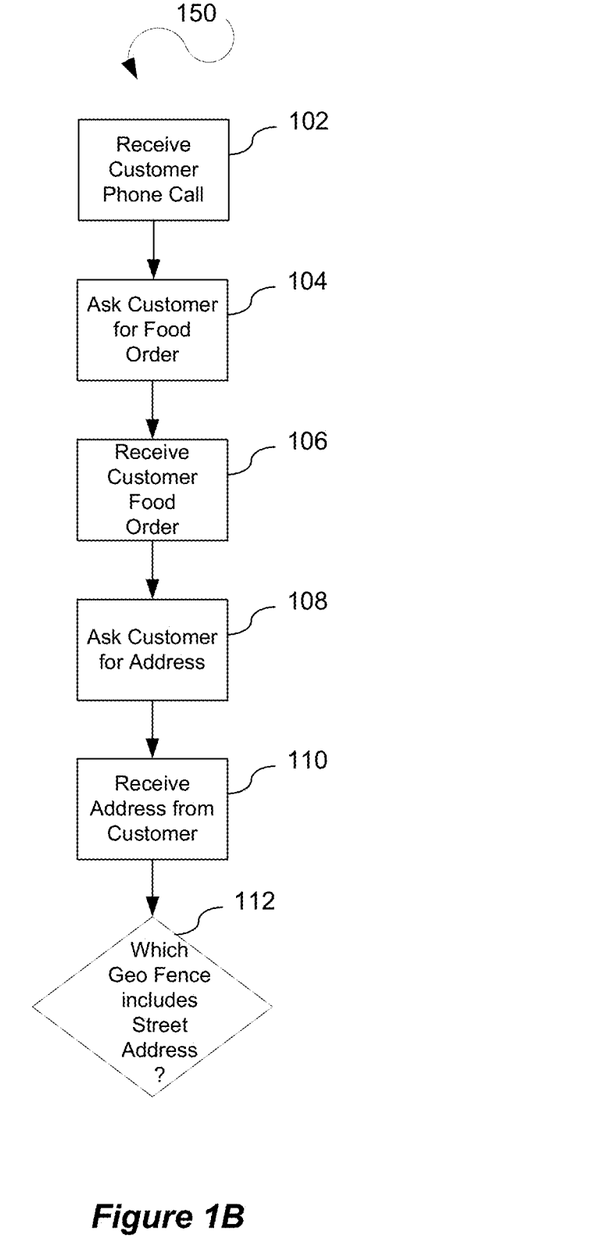
FIG. 1B illustrates a subsequent workflow that includes an example of a geo decision point that is added to the initial workflow illustrated in FIG. 1A.

After the process block 110, an author of the initial workflow 100 may want to insert nodes so that a food delivery may be delivered to the geographical location of the customer. A geo decision point, which is a decision node at which a decision may be made to follow a branch in a workflow, may be added to the initial workflow 100. FIG. 1B illustrates a subsequent workflow 150 that includes an example of a geo decision point 112 that is added to the initial workflow 100 illustrated in FIG. 1A. At the geo decision point 112, a geographic condition determines how the initial workflow 100 proceeds. The user, e.g., author, of the initial workflow 100 may define the geo decision point 112 so that a street address determined from the customer address is compared with one or more geo fences to determine if the street address is within any of those geo fences. If a determination is made that the street address is within one of those geo fences, the initial workflow 100 may proceed according to how a branch of the initial workflow is authored for that geo fence. In one embodiment, the geo decision point 112 may be dragged and dropped from a menu in a visual editor and/or workflow authoring system. The condition and/or one or more geo fences may then be defined subsequently. Alternatively, a command may be utilized to insert the geo decision point 112.

The initial workflow 100 is just an example of a workflow for a food delivery system. Other initial workflows may be utilized for a food delivery system. Further, other initial workflows may be utilized for various industries, projects, etc. For example, initial workflows may be authored for construction, manufacturing, financial, insurance, retail, service, or like projects.

A workflow author may utilize a visual editor to author the initial workflow 100. The visual editor may be a computer program having instructions that are executed by a processor. The workflow author may interact with the visual editor through a touch interface, pointing interface, and/or the like.

Figure 2:
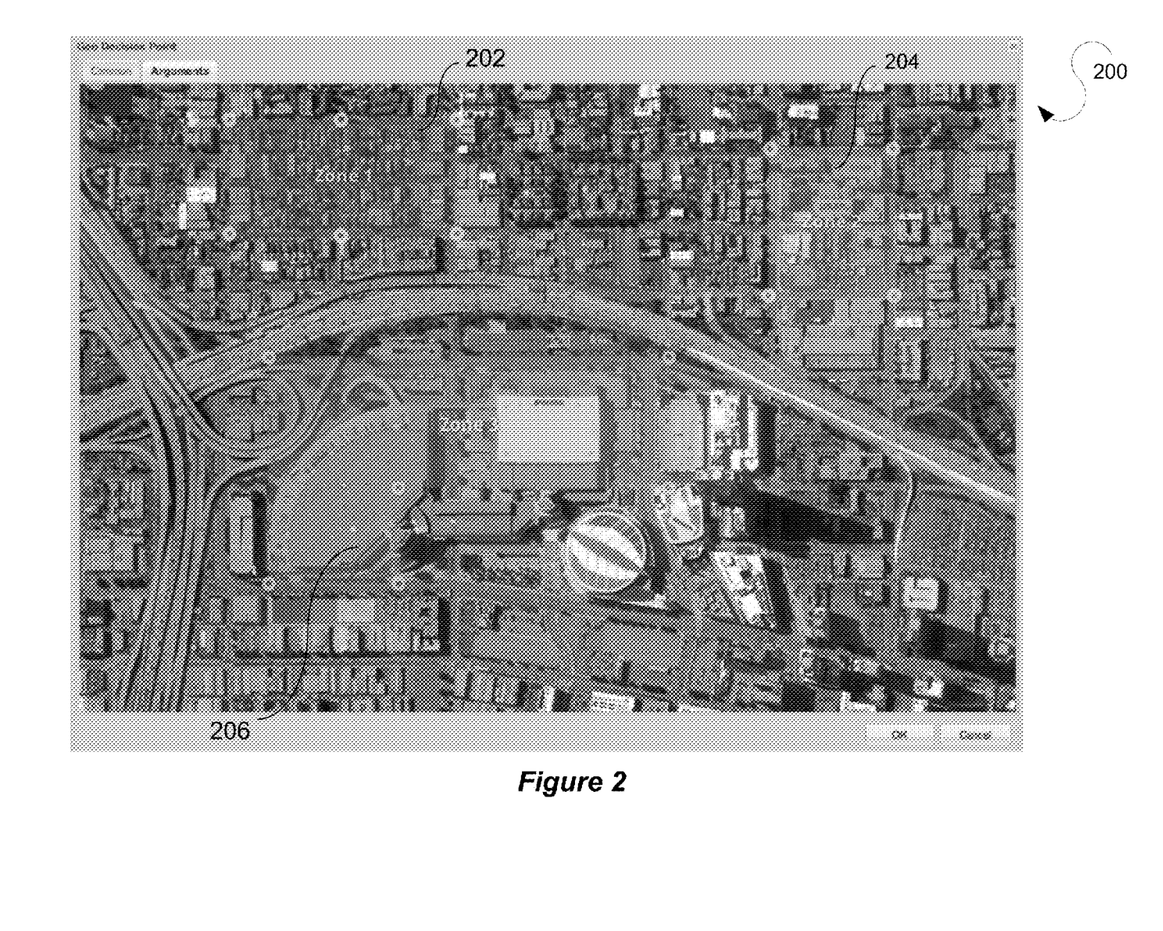
FIG. 2 illustrates a map interface that may be utilized to select one or more geo fences corresponding to a geo decision point.

FIG. 2 illustrates a map interface 200 that may be utilized to select one or more geo fences corresponding to a geo decision point. As an example, the map interface 200 illustrates satellite imagery of a section of a city. A user, e.g., a workflow author, may interact with the map interface to define one or more geo fences. For example, the user may select a first geo fence 202 a first zone, a second geo fence 204 for a second zone, and a third geo fence 206 for a third zone. As an example, a user may utilize a touch interface to mark the shapes of the geo fences. For instance, a user may tap the corner points of a shape of a geo fence. Each tap may generate a boundary point. As an example, four taps may generate four boundary points for a rectangle. The user may optionally add points, adjust points, or the like through touch inputs. Further, a user may utilize touch commands to drag the points and/or boundaries of a shape to change the dimensions of a geo fence. As an example, a user may utilize a finger to select a point and drag the point to a new location in the map interface 200. A user may utilize a variety of touch inputs to draw polygon shapes or customize his or her own shapes. Alternatively, a user may utilize one or more predefined shapes to select geo fence. As an example, a user may select a predefined rectangle and adjust the dimensions of the predefined rectangle to match the intended geographic location.

Figure 3:
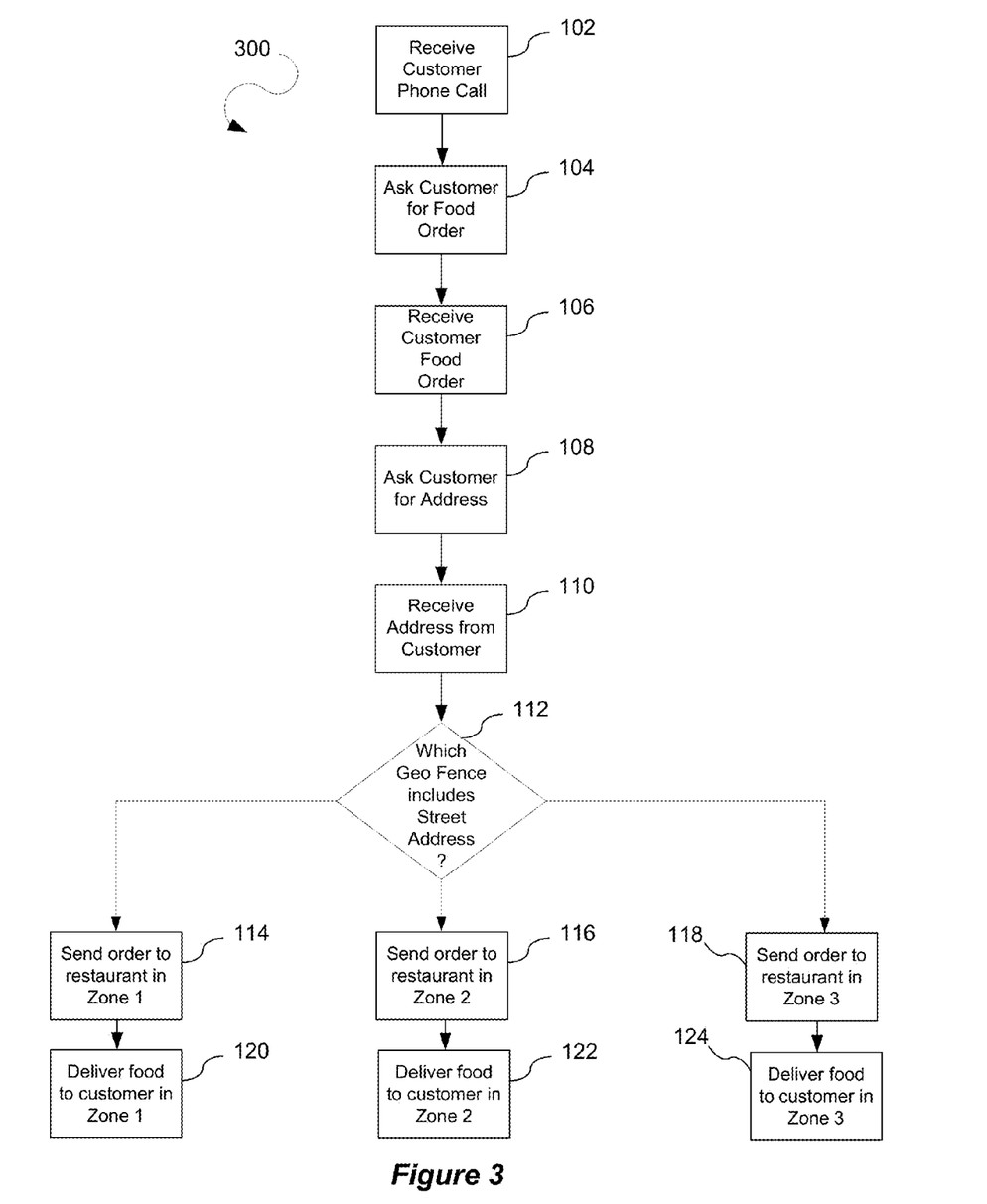
FIG. 3 illustrates a workflow that includes the geo decision point and the branches that may be followed based on a condition being met at the geo decision point 112.

FIG. 3 illustrates a workflow 300 that includes the geo decision point 112 and the branches that may be followed based on a condition being met at the geo decision point 112. As an example, a zip code may be determined from the address received at the process block 110. At the geo decision point 112, a determination is made as to which geo fence includes the zip code. If the zip code resides in the first geo fence 202 illustrated in FIG. 2, the workflow 300 proceeds to a process block 114. At the process block 114, the workflow 300 sends the food order to a restaurant in the first zone. For example, a worker may call the restaurant in the first zone or the order may be sent electronically to the restaurant in the first zone. The workflow may then proceed to a process block 120. At the process block 120, the restaurant in the first zone may then deliver the food order to the customer. If, at the geo decision point 112, a determination is made that the zip code resides in the second geo fence 204 illustrated in FIG. 2, the workflow 300 proceeds to a process block 116. At the process block 116, the workflow 300 sends the food order to a restaurant in the second zone. For example, a worker may call the restaurant in the second zone or the order may be sent electronically to the restaurant in the second zone. The workflow may then proceed to a process block 122. At the process block 122, the restaurant in the second zone may then deliver the food order to the customer. If, at the geo decision point 112, a determination is made that the zip code resides in the third geo fence 206 illustrated in FIG. 2, the workflow 300 proceeds to a process block 118. At the process block 118, the workflow 300 sends the food order to a restaurant in the third zone. For example, a worker may call the restaurant in the third zone or the order may be sent electronically to the restaurant in the third zone. The workflow may then proceed to a process block 124. At the process block 124, the restaurant in the second zone may then deliver the food order to the customer. The workflow 300 is just an example. Different or multiple geo decision points may be utilized. As an example, an additional geo decision point may be inserted in one or more of the branches originating at the geo decision point 112.

Figure 4:
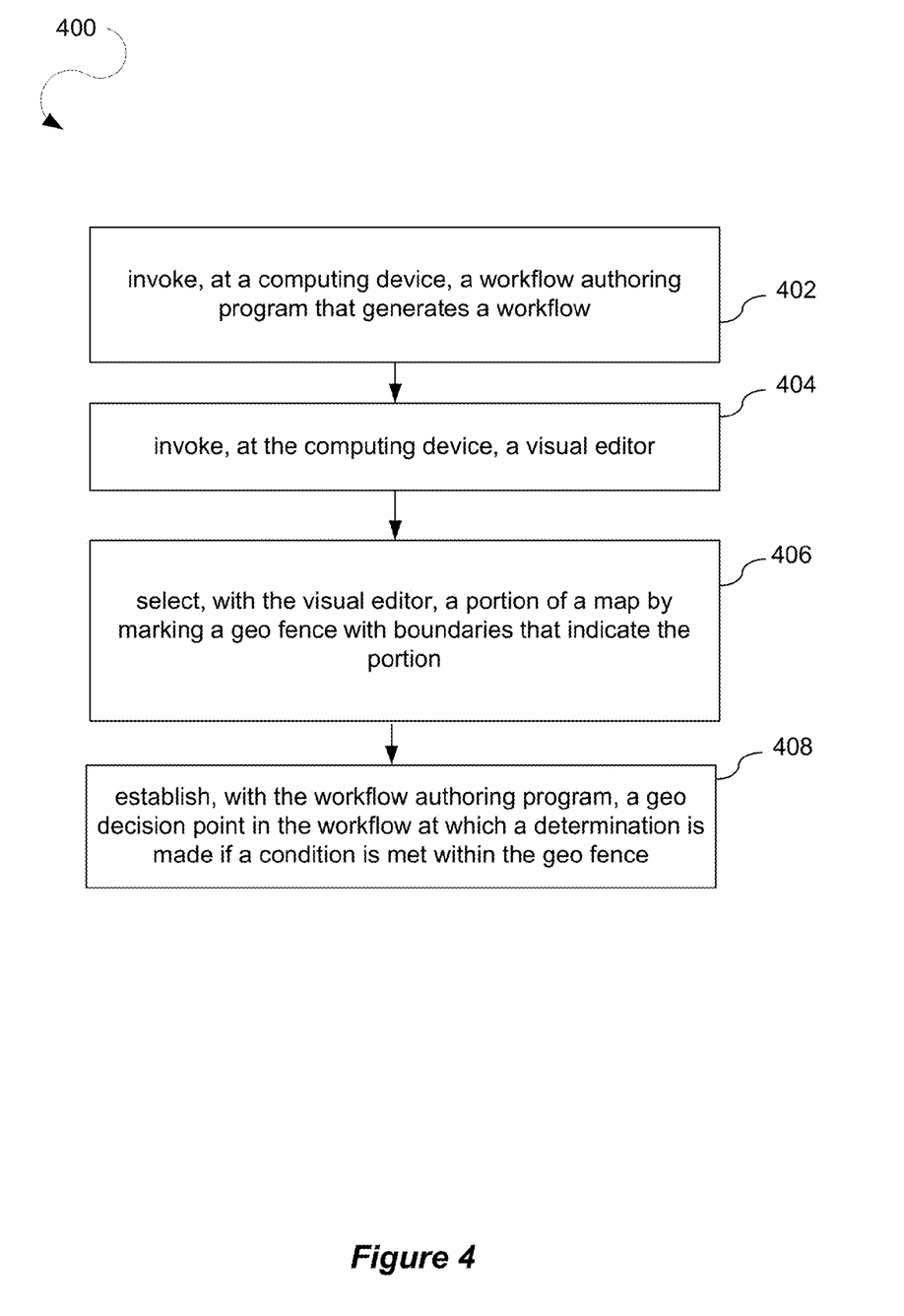
FIG. 4 illustrates a process that may be utilized to generate a geo fence.

FIG. 4 illustrates a process 400 that may be utilized to generate a geo fence. At a process block 402, the process 400 invokes, at a computing device, a workflow authoring program that generates a workflow. Further, at a process block 404, the process 400 invokes, at the computing device, a visual editor. In addition, at a process block 406, the process 400 selects, with the visual editor, a portion of a map by marking a geo fence with boundaries that indicate the portion. At a process block 408, the process 400 also establishes, with the workflow authoring program, a geo decision point in the workflow at which a determination is made if a condition is met within the geo fence.

The configurations provided for herein provide an increase in the usability of workflow technology. By displaying geo fences in context visually, a user may avoid entering spatial coordinates in form fields that do not intuitively correlate to an intended location. Rather than involving specialized systems, specialized tools, and a high level of programming sophistication, the configurations provided for herein may be more accessible to a larger population of technology workers.

Any of the configurations described herein may be utilized with a variety of computing devices. A computing device may be personal computer ("PC"), laptop, notebook, smartphone, cell phone, tablet device, personal digital assistant ("PDA"), kiosk, or the like. Further, any of the configurations described herein may be utilized with a variety of different user interfaces.

Figure 5:
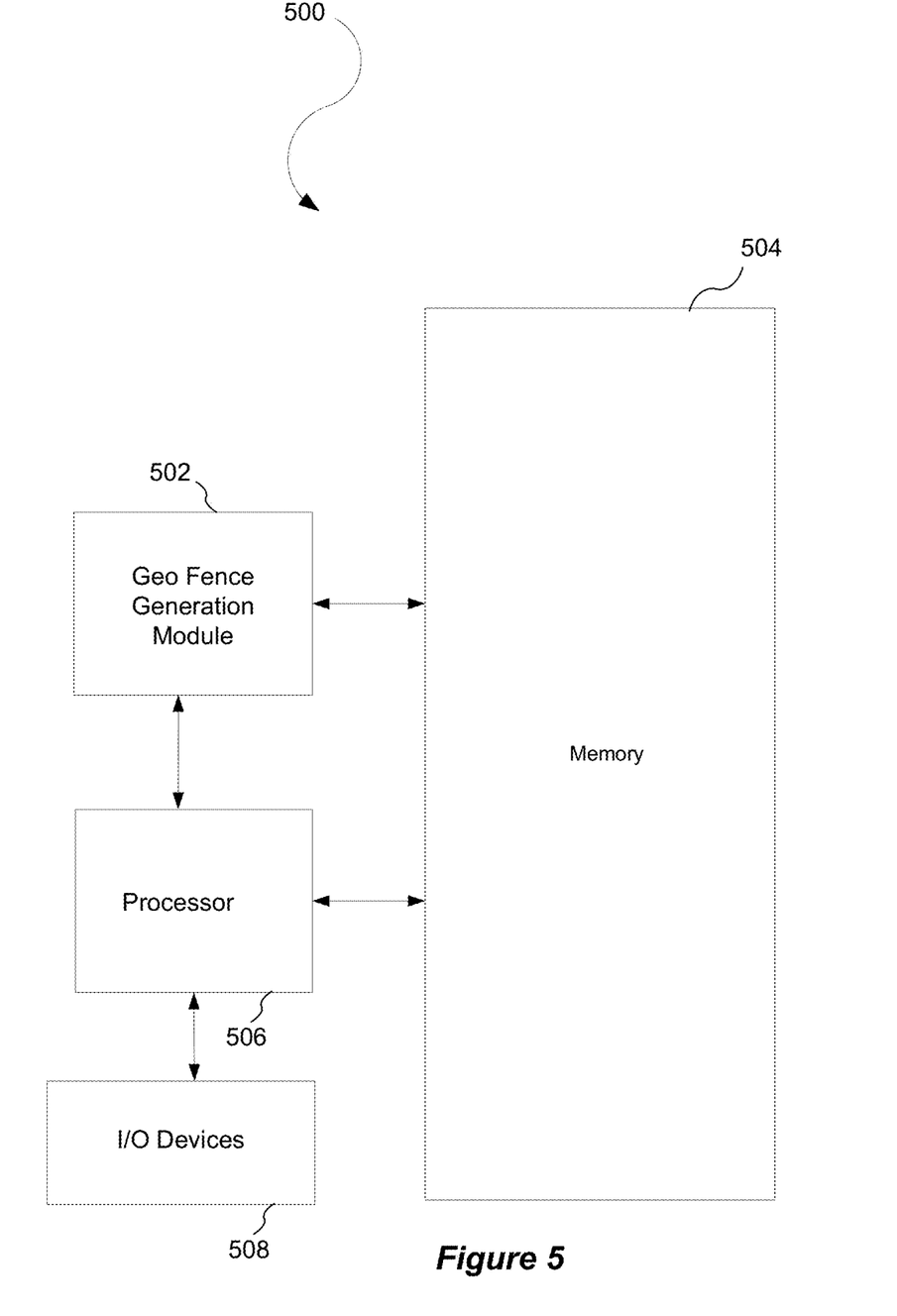
FIG. 5 illustrates a system configuration that may be utilized to generate a geo fence.

FIG. 5 illustrates a system configuration 500 that may be utilized to generate a geo fence. In one embodiment, a geo fence generation module 502 interacts with a memory 504 and a processor 506. In one embodiment, the system configuration 500 is suitable for storing and/or executing program code and is implemented using a general purpose computer or any other hardware equivalents. The processor 506 is coupled, either directly or indirectly, to the memory 504 through a system bus. The memory 504 can include local memory employed during actual execution of the program code, bulk storage, and/or cache memories which provide temporary storage of at least some program code in order to reduce the number of times code must be retrieved from bulk storage during execution.

The Input/Output ("I/O") devices 508 can be coupled directly to the system configuration 500 or through intervening input/output controllers. Further, the I/O devices 508 may include a keyboard, a keypad, a mouse, a microphone for capturing speech commands, a pointing device, and other user input devices that will be recognized by one of ordinary skill in the art. Further, the I/O devices 508 may include output devices such as a printer, display screen, or the like. Further, the I/O devices 508 may include a receiver, transmitter, speaker, display, image capture sensor, biometric sensor, etc. In addition, the I/O devices 508 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 500 to enable the system configuration 500 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions may be written by one of ordinary skill in the art following the description of the figures corresponding to the processes and stored or transmitted on a computer readable medium. The instructions may also be created utilizing source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the computer program products, processes, apparatuses, and systems described herein can take the form of entirely hardware embodiments, entirely software embodiments, or embodiments containing both hardware and software elements. If software is utilized to implement the method or system, the software may include but is not limited to firmware, resident software, microcode, etc.

It is understood that the computer program products, processes, apparatuses, and systems described herein may also be applied in other types of computer program products, processes, apparatuses, and systems. Those skilled in the art will appreciate that the various adaptations and modifications of the embodiments of the computer program products, processes, apparatuses, and systems described herein may be configured without departing from the scope and spirit of the present computer program products, processes, apparatuses, and systems. Therefore, it is to be understood that, within the scope of the appended claims, the present computer program products, processes, apparatuses, and systems may be practiced other than as specifically described herein.

I claim:

1. One or more non-transitory computer-readable storage devices, comprising instructions executable by one or more processors of a computing device to implement a workflow authoring system configured to generate a location-aware workflow, the generation comprising:
    invoking a visual editor, the visual editor configured to:
    receive inputs specifying a sequence of tasks of an initial workflow; insert a node in the initial workflow, the node defining a decision point in the initial workflow, the decision point making a decision based upon a geographic location;
    display a map in the visual editor; and
    responsive to receiving an input to select one or more regions of the map, mark the one or more selected regions with boundaries that indicate the selected regions of the map, the decision point comparing the geographic location with the one or more selected regions to determine a branch to follow in the sequence of tasks after the decision point, the determination being based on the geographic location being within one of the one or more selected regions, and the branch being associated with the one of the one or more selected regions.

2. The one or more computer-readable storage devices of claim 1, wherein the marking of the one or more selected regions is performed through a touch interface, and wherein the receiving the input to select the one or more regions comprises receiving a plurality of taps through the touch interface, each tap corresponding to a corner point of one of the one or more regions of the map.

3. The one or more computer-readable storage devices of claim 2, the visual editor further configured to:
    receive one or more inputs through the touch interface to add points to a boundary of a region.

4. The one or more computer-readable storage devices of claim 2, the visual editor further configured to:
    receive one or more inputs through the touch interface to adjust the location of one or more of the corner points of a region.

5. The one or more computer-readable storage devices of claim 1, wherein the map is generated based on GPS coordinates.

6. The one or more computer-readable storage devices of claim 1, wherein the map is based on RTLS based positioning.

7. The one or more computer-readable storage devices of claim 1, wherein there are multiple branches to follow from the decision point in the location-aware workflow and each branch of the multiple branches is associated with a least one of the selected regions.

8. The one or more computer-readable storage devices of claim 7, wherein each branch comprises tasks in the location-aware workflow that are specific to the at least one of the selected regions associated with the branch.

9. The one or more computer-readable storage devices of claim 1, wherein the insertion of the node in the initial workflow comprises dragging the decision point from a menu in the visual editor and dropping the dragged decision point into the initial workflow.

10. The one or more computer-readable storage devices of claim 1, wherein the initial workflow is one of a food delivery workflow, a construction industry workflow, a manufacturing workflow, a financial industry workflow, an insurance industry workflow, or a retail workflow.

11. A method to create a location-aware workflow, comprising:
receiving inputs, in a visual editor, specifying a sequence of tasks of an initial workflow;
inserting a node in the initial workflow, the node defining a decision point in the initial workflow, the decision point making a decision based upon a geographic location;
displaying a map in the visual editor; and
marking, in response to receiving an input, boundaries of one or more selected regions on the map, the decision point comparing the geographic location with the one or more selected regions to determine a branch to follow in the sequence of tasks, after the decision point, the determination being based on the geographic location being within the boundaries of one of the one or more selected regions, and the branch being associated with the one of the one or more selected regions.

12. The method of claim 11, wherein the marking is performed through a touch interface, and wherein the marking comprises receiving a plurality of taps through the touch interface, each tap corresponding to a corner point of one of the one or more regions of the map.

13. The method of claim 11, wherein the map is generated based on GPS coordinates.

14. The method of claim 11, wherein the map is based on RTLS based positioning.

15. The method of claim 11, wherein the branch comprises tasks in the location-aware workflow that are specific to the selected region associated with the branch.

16. A system comprising:
a display;
one or more processors;
memory, coupled to the one or more processors, comprising instructions executable to implement a location-aware workflow authoring system comprising:
receiving inputs specifying a sequence of tasks of an initial workflow;
inserting a node in the initial workflow, the node defining a decision point in the initial workflow, the decision point making a decision based upon a geographic location;
displaying a map in a visual editor; and
defining boundaries of one or more selected regions by drawing the boundaries on the map displayed in the visual editor, the decision point comparing the geographic location with the one or more selected regions to determine a branch to follow in the sequence of tasks after the decision point, the determination being based on the geographic location being within the boundaries of one of the one or more selected regions, and the branch being associated with the one of the one or more selected regions.

17. The system of claim 16, wherein the display is a touchscreen display and wherein the drawing the boundaries is performed through a touch interface, and wherein the defining the boundaries comprises receiving a plurality of taps through the touch interface, each tap corresponding to a corner point of one of the one or more regions of the map.

18. The system of claim 16, wherein the map is generated based on one of GPS coordinates or RTLS based positioning.

19. The system of claim 16, wherein there are multiple branches to follow from the decision point in the location-aware workflow and each branch of the multiple branches is associated with a least one of the selected regions.

20. The system of claim 16, wherein the comparing the geographic location with the one or more selected regions is effective to enable triggering a client-side event.

21. The system of claim 16, wherein the comparing the geographic location with the one or more selected regions is effective to enable triggering execution of a server-side business rule.

* * * * *